United States Patent [19]
Nishi et al.

[11] 3,889,354
[45] June 17, 1975

[54] METHOD OF FORMING A CRIMPED TUBE JOINT

[75] Inventors: Sunao Nishi; Shojiro Ikeda, both of Nagasaki; Asao Kawazoe, Tokyo, all of Japan

[73] Assignee: Shinto Kogyo Kabushiki Kaisha, Nagasaki, Japan

[22] Filed: Feb. 8, 1974

[21] Appl. No.: 440,747

Related U.S. Application Data

[63] Continuation of Ser. No. 142,803, May 12, 1971, abandoned, which is a continuation of Ser. No. 809,653, March 24, 1969, abandoned.

[30] Foreign Application Priority Data

Mar. 29, 1968 Japan.............................. 43-20080

[52] U.S. Cl............................... 29/516; 285/382.2
[51] Int. Cl...................... B21d 39/00; B23p 11/00
[58] Field of Search...................... 29/516, 517, 518; 285/382.2, 179

[56] References Cited

UNITED STATES PATENTS

| 2,064,129 | 12/1936 | Temple | 29/517 |
| 2,121,558 | 6/1938 | Coe et al | 29/516 UX |
| 2,202,125 | 5/1940 | Temple | 29/516 UX |

*Primary Examiner*—Charlie T. Moon
*Attorney, Agent, or Firm*—Holman & Stern

[57] ABSTRACT

A first pipe end is crimped (contracted) over one end of a second pipe inserted telescopically into the first pipe end by two compressing jaws having opposed semi-cylindrical concavities of equal radius of curvature equal to the outer radius of the first pipe end after crimping, whereby a uniform, leakproof contact pressure, due to elastic reaction, is established between the contacting surfaces.

2 Claims, 14 Drawing Figures

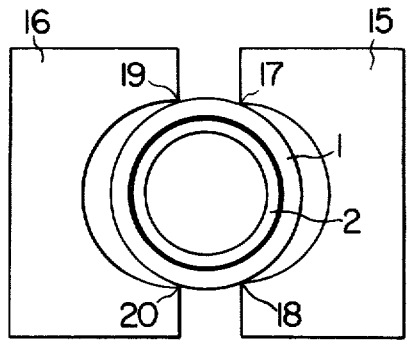
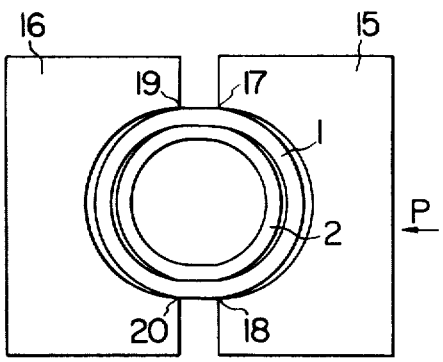
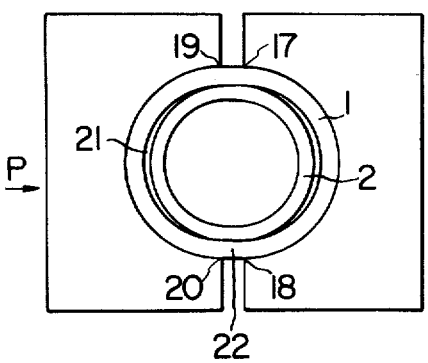
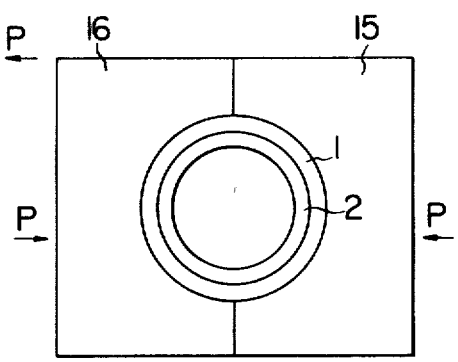
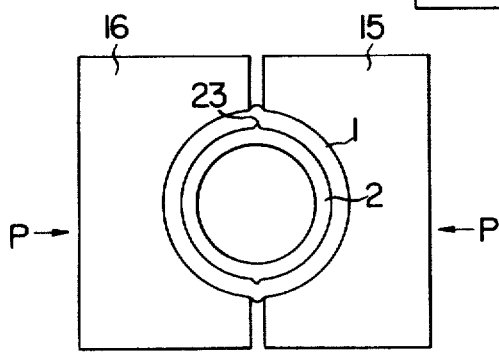

METHOD OF FORMING A CRIMPED TUBE JOINT

This is a continuation of application Ser. No. 142,803, filed May 12, 1971, now abandoned, which in turn is a continuation of U.S. Ser. No. 809,653, filed Mar. 24, 1969 now abandoned.

BACKGROUND OF THE INVENTION

This invention relates to techniques in connecting tubular structures and more particularly to a new leakproof joint between metal tubes and pipes having both elasticity and plasticity, and to a new method for forming the joint.

PRIOR ART

Common examples of pipe joints known heretofore are those depending on screw threads, flanges, and various other connecting and assembling devices. Almost all of these devices are complicated, require precise fabrication, and cannot be made leakproof or fluid-tight without one or more sealing or caulking materials. For this reason, the conditions of use of the pipes connected thereby are limited by the properties of the sealing materials, irrespective of the properties of the pipes. Furthermore, welding and brazing to make pipe joints require high skill and relatively expensive equipment. Thus, the connecting of pipes requiring gas tightness or water tightness as, for example, city gas pipes and water supply pipes has heretofore been difficult.

In addition, certain pipes must be used at high temperatures. For example, lance pipes for blowing oxygen into steel producing furnaces are ordinarily used in high temperature furnaces at temperatures of the order of about 1800°C, whereby the connecting of such pipes has been difficult. That is, such pipes heretofore have been connected with screw joints or by welding, but since sealing materials are useless therein, there has been the danger of oxygen leakage in the case of screw joints and resulting burning off and breakage of the pipes. Moreover, wastage of oxygen and the pipes accumulate. Furthermore, curved pipes remaining after use cannot be connected unless they are straightened. In the case of welded joints, weld beads flowing into the pipes impair the flow rate of the gas therewithin.

The principle of direct coupling between metal pipes according to the invention as described hereinafter is similar to that involved in known tube expanding techniques. That is, for example, by expanding the end of a tube by means of a tube expander and causing the tube end to press against a hole in a tube plate (or tube sheet) and thereby produce a reactionary elastic contact force, a highly gas-tight joint of high reliability can be obtained without the use of any sealing material. This tube expanding technique, however, can be practiced only at the extreme end of a tube because of the construction of the tube expander and cannot be applied to long tubes or bent or curved tubes or pipes.

The present invention contemplates the application of the direct-coupling relationship between metal tubes in this tube expanding technique to the connecting of long pipes to long pipes or of bent pipes and, for this purpose, contemplates the reverse procedure of causing the pipes to contract radially.

While this idea, itself, is extremely simple, the uniform radial contraction of pipes in actual practice is much more difficult than radial expansion thereof. The more contraction of pipes can be readily accomplished, but with a non-uniform contraction, a leakproof pipe joint cannot be obtained.

For example, in the specification of Japanese Pat. No. 440,011 (Patent Publication No. 17586/1964), the compression of pipes to produce a pipe joint is described, but since the force application is not uniform and, moreover, is locally concentrated (linearly), the pipes are not uniformly crimped or contracted. Consequently, the contact pressure is not generated uniformly, whereby, while a connection having an external appearance of a pipe joint can be obtained, it is clear that gas tightness and liquid tightness which constitute requisite features of a pipe joint cannot be attained.

Furthermore, while uniform tube expansion can be readily accomplished in the tube expanding technique by causing rollers to undergo planetary motion as they press against the tube inner surface, the application of this method in reverse by causing rollers to undergo planetary motion as they press against the exterior surface of a pipe does not produce the desired contraction of the pipe. Rather, contrary to the intended result, the pipe wall is flattened out and expanded in area by the rolling action of the rollers.

SUMMARY OF THE INVENTION

It is an object of the present invention to provide leakproof joints between tubular structures which joints can be easily and reliably formed manually by an unskilled person without the use of any sealing or caulking material.

Another object of the invention is to provide a simple method for forming joints of the above stated character.

Still another object of the invention is to provide joints of the above stated character which are applicable to a wide range of tubes and pipes including those used for conducting fluids at high pressures and those used in environments at high temperatures.

The present invention is directed to a method of forming a leak-proof joint between end parts of first and second pipes by means of a sleeve having opposite ends, with the pipes and sleeve having both elasticity and plasticity, in which the inner diameter of the sleeve is approximately equal to the outer diameter of the first and second pipes, comprising the steps of inserting the end part of the first pipe into one end of the sleeve, inserting the end part of the second pipe into the other end of the sleeve, placing a portion of each of the overlapped end parts of the first and second pipes and the sleeve between opposed semi-circular concave faces of two diametrically opposed jaw members and having the same radius, the length of the faces being equal to a compressing distance of the overlapped parts from the end edge of the sleeve, the radius being equal to the desired outer radius of each overlapped portion of the sleeves after crimping, and then applying a crimping force to both jaw members from diametrically opposite sides in a direction perpendicular to the axial direction of the pipes to press the inner surface of the sleeve at each overlapped portion respectively, thereby causing uniform contact pressure between the surfaces thus contacted.

The nature, principle, details, and utility of the invention will be more clearly apparent from the following detailed description with respect to preferred embodiments of the invention when read in conjunction with

BRIEF DESCRIPTION OF THE DRAWINGS

In the drawings:

FIGS. 10 through 13, inclusive, are explanatory cross-sectional views indicating progressive steps in the formation of a joint according to the invention; and FIG. 14 is a cross-sectional view indicating undesirable flow of surplus metal which tends to occur when the amount of crimping (contracting) in one step is excessive.

DETAILED DESCRIPTION

Figure 1:
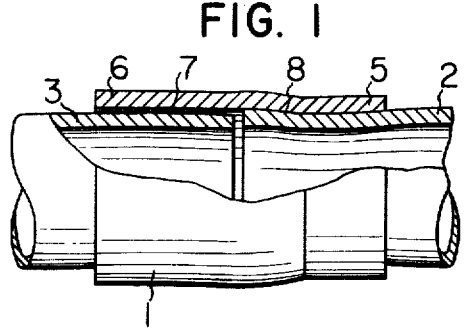
FIGS. 1, 2, 3, and 4 are side views, with parts cut away to show parts in longitudinal section, showing examples of various modes of practice of the invention.

FIG. 1 illustrates the case of a straight joint and indicates the status-prior to and after pipe crimping or compression to form the joint. One end of a short pipe or sleeve 1 constituting a coupling, that is, a crimping or compression part 5 thereof, is connected by a crimped pipe joint according to the invention to the end of a first pipe 2. The other end of the short pipe 1, that is a compression part 6 thereof, is shown as being fitted over the end of a second pipe 3 preparatory to connection thereto in accordance with the invention.

While it is customary to expect a clearance 7 due to allowance between the interior surface of the outer pipe and the exterior surfaces of the inner pipes as indicated on the side of crimping part 6, the amount of compression becomes excessive when this clearance is excessive. Therefore, a small clearance is desirable. While the contact surfaces of the pipes need not be precisely finished surfaces, products of corrosion and foreign matter must be completely removed since they impair gas tightness.

The pipe joint of the invention is extremely simple as indicated in FIG. 1 and is inexpensive since troublesome fabrication steps such as screw thread cutting are unnecessary. Furthermore, since there is no necessity for a screwing operation in making the connection, the connection is greatly facilitated even when the pipes to be joined are long or are bent.

When the compression part 5 is compressed and contracted, it presses with great force on the corresponding part of the pipe 2, whereby a great contact force is produced by the resulting elastic reaction between the two contacting surfaces, which thereby assume a state of intimate tightness. Accordingly, no sealing material whatsoever is necessary. Furthermore, since the pipe 2 is connected in a state wherein a part thereof somewhat inward from its extreme end is crimped or compressed, an annular part 8 near its extreme end is radially expanded as a reactionary result. As a result, the clearance between the pipes 1 and 2 is positively closed, and, moreover, the radially expanded part 8 even produces a reverse wedge state resisting extraction of the pipe 2 and thereby having the effect of greatly increasing the joint strength.

Figure 2:
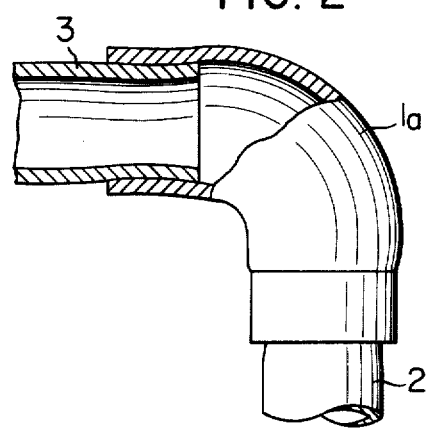
Figure 3:
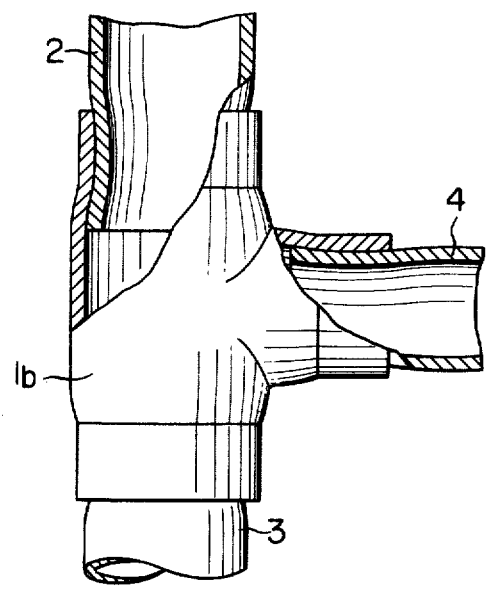

In the example illustrated in FIG. 2, a bent or curved pipe 1A constituting an elbow fitting connects two pipes 2A and 3A which are perpendicular to each other. In another example as illustrated in FIG. 3, a Tee-shaped pipe 1b constituting a Tee fitting connects three pipes 2b, 3b, and 4. It will be apparent that the desirable features of the straight joint described above with reference to FIG. 1 are achievable also in these examples of an elbow and a Tee. That is, irrespective of the configuration of the joint, the joint can be effectively made as long as one pipe end to be joined to another can be fitted into or onto that other pipe end.

Figure 4:
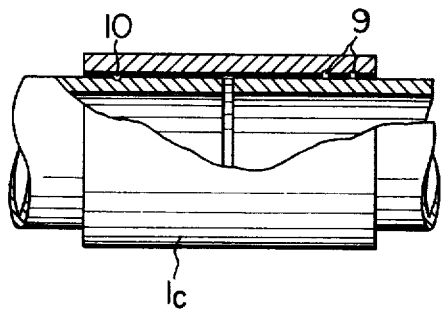

A highly effective technique in the practice of the invention is to form one or more narrow circumferential grooves in at least one of the two pipes to be connected as exemplified by narrow grooves 9 and 10 in FIG. 4. When the pipes are then crimped, these grooves serve as spaces for accommodating surplus metal produced by contraction of the pipes (that is, the natural surplus pipe material due to the decrease in the circumferences of the pipes). Accordingly, a smaller compression force suffices, and since a coupling relationship of metal-to-metal enmeshment is produced, the gas tightness is further improved.

As mentioned hereinbefore, radial compression of a pipe to cause uniform contraction thereof has been extremely difficult in actual practice. Uniform contraction of a pipe can be achieved by applying uniform pressure thereon from an infinite number of directions, but the application of such a pressure requires extremely large and complicated equipment such as a pipe manufacturing machine, and it is not possible to contract a pipe over a portion thereof limited to a certain part to be connected.

Figure 5:
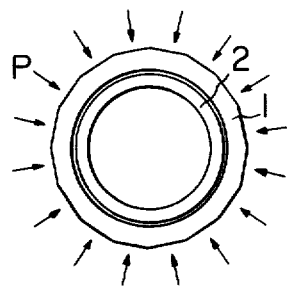
FIGS. 5 through 9, inclusive, are explanatory cross-sectional views indicating the difficulty of compressing pipes uniformly.

Pipe contraction of a uniformity satisfactory for industrial purposes can be attained by simultaneously applying pressure from a large number of directions as indicated in FIG. 5, although this number of directions is not infinite. However, an apparatus for thus applying pressure from a large number of directions tends to be complicated and to be of massive size since it must have sufficient strength, whereby it is not practical.

Figure 6:
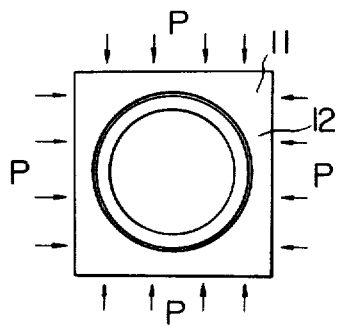

If, in order to simplify the pressure applying apparatus for practical purposes, the compression part of the outer pipe is provided with a square shape as shown in FIG. 6, and uniform pressure is applied thereon from four directions, corners parts 11 cannot readily deform or deflect since they are thick and, therefore, have high rigidity. Parts 12, are thin, however and, have relatively low rigidity and will deform with relative ease, whereby the deformation will tend to develop in a concentrated manner in only the parts 12, and contraction will not occur uniformly over the entire circumference of the pipe.

Figure 7:
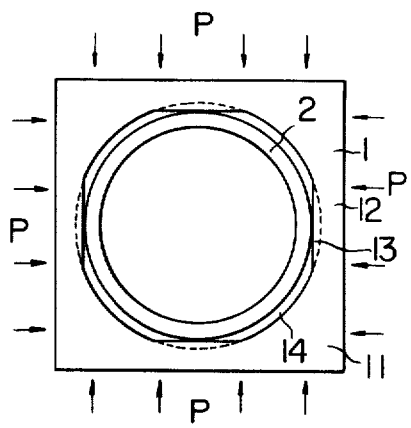

More specifically, as indicated in FIG. 7, the four thinnest parts 12 of least rigidity are initially caused by forces P, P to deform plastically, whereby surplus metal flows into the space between the pipes 1 and 2 as indicated at 13 and finally contacts the outer surface of the pipe 2. At this time, spaces 14 are left as shown between the interior surface of the corner parts 11 and the exterior surface of the pipe 2.

Figure 8:
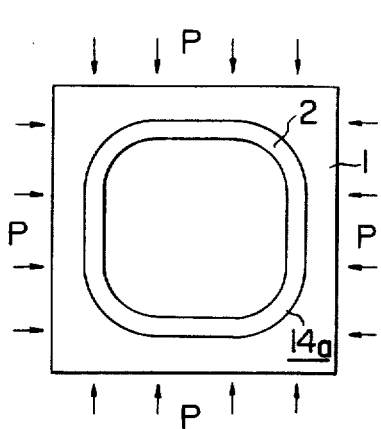

Then, when further compression is applied, the pipe 2 deforms in a manner to fill the spaces 14, and, at the same time, the deformation of the compression part of pipe 1 also progressively spreads from the thin parts 12 toward the corner parts 11 until the pipes assume a state as shown in FIG. 8 which at first appears to be one of intimate contact. However, the contact pressure of the corner parts 11 is less than that of the thin parts 12, or microscopically small gaps 14a remain between the pipes, whereby gas tightness cannot be attained.

Figure 9:
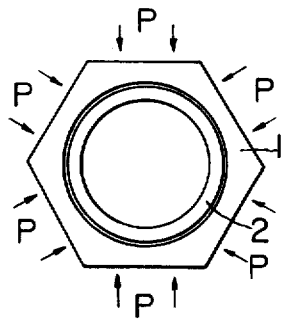

While an arrangement wherein a hexagonal compression part as illustrated in FIG. 9 and a device for applying compressing force from six directions are used is also simple, a uniform state of intimate contact cannot be attained thereby for the same reason as in the case of the square compression part described above. The difference in contact pressures in the hexagonal case, of course, is less than that in the square case because of the small difference in wall thicknesses, and, therefore, the gas tightness is somewhat better.

While, by increasing the number of compression faces, for example, to an octagon, a twelve-sided figure, etc., it is theoretically possible to approach a uniform pipe contraction in proportion, the compression tool unavoidably becomes complicated and massive in size as mentioned hereinbefore.

As described above in detail, the radial contraction of pipes uniformly is extremely difficult, and for this reason it has not been possible heretofore to produce gas-tight pipe joints by pipe crimping or compression.

We have succeeded in producing highly gas-tight pipe joints by uniformly contracting pipes with a simple tool and operation as described below with reference to FIGS. 10 through 13, inclusive.

First, the pipes to be connected are set in a compressing tool 15, 16 in the state indicated in FIG. 10. In the case illustrated, pipe 1 is a short pipe constituting a coupling pipe fitting and is fitted onto two pipes 2 and 3 (pipe 3 not shown) to be connected, with the inner diameter of the pipe 1 being substantial equal to (slightly greater than) the outer diameter of the pipes 2 and 3. The pipes 1, 2 and (3) are metal pipes such as steel pipes or copper pipes exhibiting both elasticity and plasticity. Pipe (3) is not shown in FIGS. 10 through 13 but is understood to be a pipe equivalent to pipe 3 in FIGS. 1 through 4, inclusive.

The crimping or compressing tool has two compressing jaws 15 and 16 having the same size and made of a hard, strong material such as heat hardened tool steel. These jaws 15 and 16 have respective semicircular (as viewed in cross section) cavities along arcs 17–18 and 19–20 having a length in the axial direction equal to the length in the axial direction of the pipe crimping part. The radius of each of these arcs is equal to the outside radius of pipe 1 after contraction. That is, the radius of each arc is such that the two arcs form a circular hole of a diameter equal to the outer diameter of pipe 1 after contraction when the two compression jaws close and contact each other as indicated in FIG. 13.

When, with the pipes and jaws in the state indicated in FIG. 10, forces P, P in mutually opposed directions are applied to the backs of the jaws 15 and 16 as indicated in FIG. 11, the jaws progressively approach each other as the points 17, 18, 19, and 20 thereof press uniformly on and slide along the exterior surface of pipe 1. Accordingly, pipe 1 deforms in cross section from a true circle to an ellipse, and the exterior surface thereof is brought into intimate contact with the compressing surface formed by the arcs 17–18 and 19–20 of the two jaws as indicated in FIG. 12.

At this time, the length of the cross-sectional periphery of pipe 1 is equal to the circumference of the original true circle. That is, the pipe cross section has been merely changed from a true circle to an ellipse, and there has been no contraction whatsoever of the pipe. Accordingly, the magnitude of the force P at this time is only from 1/15 to 1/20 of that at the time of the compression process step.

While pipe 2 is also transformed into an ellipse in cross section in accordance with the transformation of pipe 1 into an ellipse, the transformation of pipe 2 lags relative to that of pipe 1 by an amount corresponding to the gap between their confronting surfaces, and even at the time when the exterior surface of pipe 1 is in tight contact with the compressing surfaces of the jaws 15 and 16, gaps as indicated at 21 in FIG. 12 still remain between the two pipes.

In the case in which the difference between the diameters before and after compression, that is, the quantity of compression (or degree of pipe contraction), is large, the possibility of the points 17, 18, 19, and 20 of the jaws 15 and 16 damaging the exterior surface of pipe 1 is eliminated by pressing the pipes beforehand with forces perpendicular to force P thereby to deform the pipes into ellipses and then setting the same in the compressing tool as indicated in FIGS. 11 and 12.

In the compression state indicated in FIG. 12, most of the pipe 1 is completely restrained by the compressing surface of the tool except for very small free parts as indicated at 22. Consequently, free deformation is not permitted in the compressing process, and the pipes are contracted as their cross sections return to circles accurately conforming to the pressure surface as in die forging.

Surplus metal produced as a natural result of the contraction of the pipe periphery bulges into the gap 21 and, together with the contraction of pipe 1, closes this gap, whereby the interior surface of pipe 1 is brought into tight contact with the exterior surface of pipe 2. While surplus metal should readily bulge and flow out also at the free parts 22, it has been found that this surplus metal is gradually constricted and loses its freedom as it is progressively forced inward by the mutually approaching movement of the compressing jaws 15 and 16. In all instances of normal compression, there has been observed almost no bulging out, or no bulging out whatever, at the parts 22.

However, when the amount of compression in one step is excessive, the free part 22 also becomes excessive, whereby surplus metal flows into this part and gives rise to the formation of a part of loose contact as indicated in enlargement at 23 in FIG. 14, and gas tightness of the joint is thereby lost. Therefore, in such cases in which large amount of compression is required, it is necessary to compress the pipes progressively in a plurality of steps by means of a plurality of sets of compressing jaws having different hole diameters (different radii of arcs of their compressing surfaces).

When the jaws 15 and 16 mutually contact to assume their state shown in FIG. 13, the cross sections of the two pipes 1 and 2 are returned to circles, and the outer diameter of pipe 1 is contracted to the diameter of the circle defined by the compressing surfaces of the jaws. Since the interior surface of pipe 1 is then pressing uniformly on the exterior surface of pipe 2, pipe 2 is forced to contract as it exerts a reactionary force resisting the force of pipe 1, and a high contact pressure due to the elastic force of pipe 2 tending to return to its original form exists between the contacting surfaces of the two pipes.

The maximum contact pressure between the two pipes is obtained with an amount of compression such as to cause pipe 2 to exceed its elastic limit and be about to undergo plastic deformation. It has been found that a further compression to an extent such as to cause plastic deformation does not result in a particularly great increase in the contact pressure. The reason for this is that such compression does not cause a particularly great increase in the elasticity proportionally to the amount of compression other than an increase due to an increase in the pipe wall thickness.

When the jaws 15 and 16 are removed from pipe 1, the compressed part of pipe 1, although presumably deformed plastically, springs back slightly because of its elasticity, that is, expands slightly in the radial direction. However, since pipe 2 also expands radially in the same manner because of its elasticity, the contact pressure at the contacting surfaces of the two pipes does not decrease but produces gas tightness of the pipe joint.

The degree of gas tightness of the pipe joint increases with increasing magnitude of the contact pressure, but the contact pressure cannot be increased after the elastic limit of pipe 2 has been exceeded irrespective of how large the amount of compression is made, as above described. However, by appropriately selecting the material, wall thickness, and the contact area, i.e., compression width, of the two pipes, a contact pressure, that is, gas tightness, corresponding to and sufficient for the pressure of the fluid to be conducted through the pipe joint can be obtained.

Thus, by the practice of the invention, complicated procedures and equipment are unnecessary, and metal pipes and tubes can be connected in a gas-tight and liquid-tight manner without the use of sealing material. Accordingly, the technique of the invention is highly effective when applied to joining a large range of tubular structures such as water supply pipes and gas pipes. Furthermore, the method of the invention is also effective in forming joints in pipes subject to extremely severe conditions of use as, for example, in pipes to conduct oxygen gas in an environment at a high temperature of the order of about 1800°C, in which the pipes thus connected are rendered capable of functioning with high durability without adverse occurrences such as oxygen leakage.

In order to indicate still more clearly the nature and utility of the invention, the following examples of preferred embodiment of the invention are set forth, it being understood that these examples are presented as illustrative only and that they are not intended to limit the scope of the invention.

EXAMPLE 1

Each of several samples of pipe joints was prepared by fitting approximately 30 mm. of the ends of two pipes each having a 27-mm. outer diameter, 21.4-mm. inner diameter (2.8-mm. wall thickness), and 1,000-mm. length into the opposite ends of a short pipe having a 34-mm. outer diameter, 27.6-mm. inner diameter (3.2-mm wall thickness), and 60-mm. length and compressing the end parts of the short pipe to cause contraction thereof in diameter of 2 mm. by means of three sets of compressing jaws all having a compression surface diameter of 32 mm. and respectively having different widths (i.e., length of compression) of 5, 10, and 15 mm., the parts of the 60-mm. short pipes 5 mm., 10 mm., and 15 mm. from the ends thereof being thus compressed.

A manually operated hydraulic press was used for the compressing operation, one of the jaws of each set being fixed, and the other jaw being actuated together with a hydraulic piston.

The results of the pipe connecting operation and of water pressure tests of the resulting joints were as indicated in the following table, in which average values for each set of samples are set forth.

| LENGTH OF COMPRESSED PART | MAX. LOAD NECESSARY FOR FORMING ELLIPSE (ton) | MAX. LOAD NECESSARY FOR PIPE CONTRACTION (ton) | LEAKAGE FLOWRATE UNDER WATER PRESSURE TEST (gram/hour) | | | | | |
|---|---|---|---|---|---|---|---|---|
| | | | 3 kg/cm² | 5 kg/cm² | 10 kg/cm² | 15 kg/cm² | 20 kg/cm² | 30 kg/cm² |
| 5 | 0.3 | 5.5 | (none) | 1.26 | 2.5 | — | — | — |
| 10 | 0.5 | 10.5 | (none) | (none) | (none) | (none) | 1.0 | — |
| 15 | 0.7 | 15.0 | (none) | (none) | (none) | (none) | (none) | 0.42 |

EXAMPLE 2

Sets of the samples which had been subjected to the water pressure test in Example 1 were selected and further compressed by a total amount of 3 mm. by means of compressing jaws of a compression surface diameter of 31 mm. and compression lengths respectively of 5 mm., 10 mm., and 15 mm.

The pipe joints thus compressed were again subjected to the water pressure test, whereupon it was found that the water leakage flow rates were reduced, but some leakage was observed at each of the water pressures set forth in the above table.

EXAMPLE 3

In a certain steel manufacturing plant, 300 lauce pipes remaining after use were connected in their bent state to 300 lance pipes of ¾-inch size, and the pipes thus connected were tested in actual use to blow oxygen under a pressure of 10 kg/cm². into molten steel, whereupon not one of the pipes exhibited oxygen leakage, breakage, or burning. As a result, the connecting process was remarkably facilitated with a great reduction in labor, and waste of oxygen and lance pipes was prevented.

Thus, by the practice of the invention as described above, leakproof joints between tubes and pipes can be easily and reliably formed manually and in a simple manner by unskilled persons with the use of a simple and inexpensive tool without the use of any sealing material whatsoever. Accordingly, the quality or applications of the joints which can be thus formed are not influenced by the properties of available sealing materials, and the tube joint of the invention can be applied to a wide range of uses to afford leakproofness of tubes and pipes under various operational conditions such as pressures, temperatures, and compositions of fluids conducted.

More specifically, while the present invention is effective in affording convenience, reliability, and low cost in connecting pipes such as water supply pipes and city gas pipes which are used at normal atmospheric temperatures and relatively low pressures, the invention exhibits particularly remarkable effectiveness when applied to joints in pipes subject to high pressures of several tons of kg/cm$^2$., hot water, and/or high temperatures of the order of several hundreds of degrees centigrade as, for example, in the aforementioned lance pipes within steel producing furnaces in which oxygen is used.

We claim:

1. A method of forming a leak-proof joint between end parts of first and second pipes by means of a sleeve having opposite ends in which said first and second pipes and sleeve have both elasticity and plasticity, with the inner diameter of the sleeve being approximately equal to the outer diameter of the first and second pipes, comprising the steps of inserting the end part of the first pipe into one end of the sleeve, inserting the end part of the second pipe into the other end of the sleeve, placing a portion of each of the overlapped end parts of the first and second pipes and sleeve between opposed semi-circular concave faces of two diametrically opposed jaw members and having the same radius, the length of the faces being equal to a compressing distance of the overlapped parts extending from the end edge of the sleeve but short of the telescoped pipe end, the radius being equal to the desired outer radius of each overlapped portion of the sleeve after crimping, and then applying a crimping force to both jaw members from diametrically opposite sides in a direction perpendicular to the axial direction of the pipes to plastically deform the sleeve and pipe inwardly at each overlapped portion respectively, said inwardly deformed portion extending from the end edge of the sleeve to a location short of the telescoped pipe end, thereby causing uniform contact pressure between the surfaces thus contacted.

2. The method of forming a leak-proof joint as claimed in claim 1, in which a curved pipe is used as the sleeve when the first pipe is to be jointed with the second pipe which is perpendicular to said first pipe.

* * * * *